(12) United States Patent
Huang et al.

(10) Patent No.: US 7,831,431 B2
(45) Date of Patent: Nov. 9, 2010

(54) VOICE RECOGNITION UPDATES VIA REMOTE BROADCAST SIGNAL

(75) Inventors: Ritchie Winson Huang, Torrance, CA (US); David Michael Kirsch, San Pedro, CA (US)

(73) Assignee: Honda Motor Co., Ltd., Tokyo (JP)

( * ) Notice: Subject to any disclaimer, the term of this patent is extended or adjusted under 35 U.S.C. 154(b) by 1044 days.

(21) Appl. No.: 11/554,830

(22) Filed: Oct. 31, 2006

(65) Prior Publication Data

US 2008/0103779 A1    May 1, 2008

(51) Int. Cl.
*G10L 21/00* (2006.01)
(52) U.S. Cl. .............. 704/270.1; 704/270; 704/275; 704/231; 704/246; 455/563; 455/556.1; 455/412.1; 701/36; 701/213
(58) Field of Classification Search ............... 704/275, 704/270.1, 270, 246, 243, 251, 231, 228; 455/563, 412.1, 556.1, 564, 569, 550.1, 569.2; 379/88.01, 88.02, 88.03; 701/36, 1, 213; 342/357.1, 357.06, 357.13
See application file for complete search history.

(56) References Cited

U.S. PATENT DOCUMENTS

| | | | |
|---|---|---|---|
| 4,401,852 A | 8/1983 | Noso et al. | |
| 4,468,756 A | 8/1984 | Chan | |
| 5,255,326 A | 10/1993 | Stevenson | |
| 5,274,560 A | 12/1993 | LaRue | |
| 5,345,538 A | 9/1994 | Narayannan et al. | |
| 5,543,789 A | 8/1996 | Behr et al. | |
| 5,592,385 A | 1/1997 | Katayama et al. | |
| 5,592,389 A | 1/1997 | La Rue et al. | |
| 5,638,425 A | 6/1997 | Meador, III et al. | |
| 5,666,293 A | 9/1997 | Metz et al. | |
| 5,677,990 A | 10/1997 | Junqua | |
| 5,687,221 A | 11/1997 | Oheda et al. | |
| 5,699,275 A | 12/1997 | Beasley et al. | |
| 5,748,840 A | 5/1998 | La Rue | |
| 5,752,230 A | 5/1998 | Alonso-Cedo | |
| 5,774,859 A | 6/1998 | Houser et al. | |
| 5,797,116 A | 8/1998 | Yamada et al. | |
| 5,806,018 A | 9/1998 | Smith et al. | |
| 5,829,000 A | 10/1998 | Huang et al. | |

(Continued)

FOREIGN PATENT DOCUMENTS

DE      19531121      2/1997

(Continued)

*Primary Examiner*—Vijay B Chawan
(74) *Attorney, Agent, or Firm*—Capitol City TechLaw (57) ABSTRACT

A method and a system are provided for dynamically updating voice recognition commands available for controlling a device in a vehicle. A receiver unit of a voice recognition system, located in the vehicle, receives a remotely transmitted broadcast signal. A processor of the voice recognition system extracts voice recognition data from a remaining portion of the broadcast signal and updates voice recognition commands stored in a memory unit, coupled to the processor, with the extracted voice recognition data. A voice input device of the voice recognition system receives a spoken command from a user. A voice recognition engine, coupled to the voice input device and the memory unit, determines whether the spoken command matches one of the stored voice recognition commands in the memory unit. If a match occurs, a recognized voice command is generated. The recognized voice command is sent to an affected device in the vehicle.

21 Claims, 7 Drawing Sheets

U.S. PATENT DOCUMENTS

| | | | |
|---|---|---|---|
| 5,903,864 A | 5/1999 | Gadbois et al. | |
| 5,950,160 A | 9/1999 | Rozak | |
| 5,956,684 A | 9/1999 | Ishii et al. | |
| 5,995,928 A | 11/1999 | Nguyen et al. | |
| 6,006,185 A | 12/1999 | Immarco | |
| 6,009,355 A | 12/1999 | Obradovich et al. | |
| 6,049,830 A | 4/2000 | Saib | |
| 6,064,323 A | 5/2000 | Ishii et al. | |
| 6,094,635 A | 7/2000 | Scholz et al. | |
| 6,104,500 A | 8/2000 | Alam et al. | |
| 6,108,631 A | 8/2000 | Rühl | |
| 6,112,174 A | 8/2000 | Wakisaka et al. | |
| 6,121,924 A | 9/2000 | Meek et al. | |
| 6,122,612 A | 9/2000 | Goldberg | |
| 6,125,347 A | 9/2000 | Cote et al. | |
| 6,137,863 A | 10/2000 | Brown et al. | |
| 6,185,537 B1 * | 2/2001 | Oh et al. | 704/275 |
| 6,230,098 B1 | 5/2001 | Ando et al. | |
| 6,230,132 B1 | 5/2001 | Class et al. | |
| 6,230,136 B1 | 5/2001 | Yamamoto et al. | |
| 6,236,967 B1 | 5/2001 | Brotman et al. | |
| 6,240,347 B1 | 5/2001 | Everhart et al. | |
| 6,253,122 B1 | 6/2001 | Razavi et al. | |
| 6,253,174 B1 | 6/2001 | Ishii et al. | |
| 6,256,630 B1 | 7/2001 | Gilai et al. | |
| 6,269,335 B1 | 7/2001 | Ittycheriah et al. | |
| 6,298,324 B1 | 10/2001 | Zuberec et al. | |
| 6,343,379 B1 | 1/2002 | Ozawa et al. | |
| 6,362,779 B1 | 3/2002 | Meek et al. | |
| 6,363,347 B1 | 3/2002 | Rozak | |
| 6,385,535 B2 | 5/2002 | Ohishi et al. | |
| 6,385,582 B1 | 5/2002 | Iwata | |
| 6,405,027 B1 | 6/2002 | Bell | |
| 6,405,172 B1 | 6/2002 | Baker et al. | |
| 6,411,893 B2 | 6/2002 | Ruhl | |
| 6,456,929 B1 | 9/2002 | Ohshima | |
| 6,470,496 B1 | 10/2002 | Kato et al. | |
| 6,473,734 B1 | 10/2002 | Dvorak | |
| 6,480,786 B2 | 11/2002 | Watanabe et al. | |
| 6,487,532 B1 | 11/2002 | Schoofs et al. | |
| 6,487,559 B2 | 11/2002 | McGrath et al. | |
| 6,505,155 B1 | 1/2003 | Vanbuskirk et al. | |
| 6,526,380 B1 | 2/2003 | Thelen et al. | |
| 6,535,894 B1 | 3/2003 | Schmidt et al. | |
| 6,546,334 B1 | 4/2003 | Fukuchi et al. | |
| 6,584,179 B1 | 6/2003 | Fortier et al. | |
| 6,584,439 B1 | 6/2003 | Geilhufe et al. | |
| 6,587,786 B1 | 7/2003 | La Rue | |
| 6,606,660 B1 | 8/2003 | Bowman-Amuah et al. | |
| 6,614,804 B1 | 9/2003 | McFadden et al. | |
| 6,615,131 B1 | 9/2003 | Rennard et al. | |
| 6,650,997 B2 | 11/2003 | Funk | |
| 6,654,955 B1 | 11/2003 | Kusnitz et al. | |
| 6,671,666 B1 | 12/2003 | Ponting et al. | |
| 6,675,147 B1 | 1/2004 | Woestemeyer et al. | |
| 6,691,128 B2 | 2/2004 | Natesan et al. | |
| 6,694,253 B2 | 2/2004 | Schroeder | |
| 6,694,295 B2 | 2/2004 | Lindholm et al. | |
| 6,694,296 B1 | 2/2004 | Alleva et al. | |
| 6,697,796 B2 | 2/2004 | Kermani | |
| 6,708,150 B1 | 3/2004 | Hirayama et al. | |
| 6,711,474 B1 | 3/2004 | Treyz et al. | |
| 6,718,304 B1 | 4/2004 | Tachimori et al. | |
| 6,721,702 B2 | 4/2004 | Schneider | |
| 6,725,197 B1 | 4/2004 | Wuppermann et al. | |
| 6,732,077 B1 | 5/2004 | Gilbert et al. | |
| 6,751,595 B2 | 6/2004 | Busayapongchai et al. | |
| 6,757,262 B1 | 6/2004 | Weisshaar et al. | |
| 6,789,065 B2 | 9/2004 | Berner et al. | |
| 6,799,098 B2 | 9/2004 | Horst et al. | |
| 6,820,055 B2 * | 11/2004 | Saindon et al. | 704/235 |
| 6,836,822 B1 | 12/2004 | Hatano et al. | |
| 6,876,970 B1 * | 4/2005 | Silver et al. | 704/275 |
| 6,889,191 B2 * | 5/2005 | Rodriguez et al. | 704/275 |
| 6,907,397 B2 | 6/2005 | Kryze et al. | |
| 6,917,917 B1 | 7/2005 | Kim | |
| 6,928,404 B1 | 8/2005 | Gopalakrishnan et al. | |
| 6,931,263 B1 | 8/2005 | Boucher et al. | |
| 6,999,874 B2 | 2/2006 | Seto et al. | |
| 7,006,971 B1 | 2/2006 | Stahl et al. | |
| 7,010,263 B1 | 3/2006 | Patsoikas | |
| 7,020,612 B2 | 3/2006 | Tamura | |
| 7,031,477 B1 | 4/2006 | Mella et al. | |
| 7,039,629 B1 | 5/2006 | Theimer et al. | |
| 7,072,686 B1 * | 7/2006 | Schrager | 455/556.1 |
| 7,088,266 B2 | 8/2006 | Watanabe et al. | |
| 7,155,392 B2 | 12/2006 | Schmid et al. | |
| 7,321,857 B2 * | 1/2008 | Rodriguez et al. | 704/275 |
| 7,529,677 B1 * | 5/2009 | Wittenberg | 704/275 |
| 7,577,665 B2 * | 8/2009 | Ramer et al. | 707/10 |
| 2001/0049599 A1 | 12/2001 | Brotman et al. | |
| 2001/0053956 A1 | 12/2001 | Ohishi et al. | |
| 2002/0010543 A1 | 1/2002 | Watanabe et al. | |
| 2002/0016669 A1 | 2/2002 | Ruhl | |
| 2002/0032568 A1 | 3/2002 | Saito | |
| 2002/0048350 A1 | 4/2002 | Phillips et al. | |
| 2002/0049535 A1 | 4/2002 | Rigo et al. | |
| 2002/0067839 A1 | 6/2002 | Heinrich | |
| 2002/0091475 A1 | 7/2002 | Hashimoto et al. | |
| 2002/0133353 A1 | 9/2002 | Gaitonde et al. | |
| 2002/0169618 A1 | 11/2002 | Caspari | |
| 2002/0198722 A1 | 12/2002 | Yuschik | |
| 2003/0005084 A1 | 1/2003 | Humphrey | |
| 2003/0023440 A1 | 1/2003 | Chu | |
| 2003/0028382 A1 | 2/2003 | Chambers et al. | |
| 2003/0046088 A1 | 3/2003 | Yuschik | |
| 2003/0061079 A1 | 3/2003 | Noghero et al. | |
| 2003/0064755 A1 * | 4/2003 | Piwowarski | 455/563 |
| 2003/0069734 A1 | 4/2003 | Everhart | |
| 2003/0072463 A1 | 4/2003 | Chen | |
| 2003/0076842 A1 | 4/2003 | Johansson et al. | |
| 2003/0088415 A1 | 5/2003 | Kobal et al. | |
| 2003/0093281 A1 | 5/2003 | Geilhufe et al. | |
| 2003/0095525 A1 | 5/2003 | Lavin et al. | |
| 2003/0109268 A1 | 6/2003 | Fraser et al. | |
| 2003/0120493 A1 | 6/2003 | Gupta | |
| 2003/0125869 A1 | 7/2003 | Adams, Jr. | |
| 2003/0125870 A1 | 7/2003 | Woestemeyer et al. | |
| 2003/0134629 A1 | 7/2003 | Ollis et al. | |
| 2003/0135858 A1 | 7/2003 | Nemoto | |
| 2003/0139179 A1 | 7/2003 | Fuchs et al. | |
| 2003/0149565 A1 | 8/2003 | Chang et al. | |
| 2003/0171925 A1 | 9/2003 | Werener | |
| 2003/0182054 A1 | 9/2003 | Peterson et al. | |
| 2003/0190030 A1 | 10/2003 | Alton | |
| 2003/0200096 A1 | 10/2003 | Asai | |
| 2003/0224840 A1 | 12/2003 | Frank et al. | |
| 2003/0232619 A1 | 12/2003 | Fraser | |
| 2004/0010366 A1 | 1/2004 | Videtich | |
| 2004/0012501 A1 | 1/2004 | Mazzara et al. | |
| 2004/0015354 A1 | 1/2004 | Miyauchi et al. | |
| 2004/0023645 A1 | 2/2004 | Olsen et al. | |
| 2004/0029619 A1 | 2/2004 | Liang et al. | |
| 2004/0030460 A1 | 2/2004 | Bergmann et al. | |
| 2004/0034527 A1 | 2/2004 | Hennecke et al. | |
| 2004/0039500 A1 | 2/2004 | Amendola et al. | |
| 2004/0048572 A1 | 3/2004 | Godfrey | |
| 2004/0048577 A1 | 3/2004 | Godfrey et al. | |
| 2004/0116141 A1 | 6/2004 | Loven et al. | |
| 2004/0122670 A1 | 6/2004 | Nuessle et al. | |
| 2004/0143440 A1 | 7/2004 | Prasad et al. | |
| 2004/0150746 A1 | 8/2004 | Shimamoto | |
| 2004/0176139 A1 | 9/2004 | Wang | |
| 2004/0176959 A1 | 9/2004 | Wilhelm et al. | |

| | | |
|---|---|---|
| 2004/0193416 A1 | 9/2004 | Emonts et al. |
| 2004/0198255 A1 | 10/2004 | Hayashida |
| 2004/0199388 A1 | 10/2004 | Armbruster et al. |
| 2004/0203340 A1 | 10/2004 | Oesterling |
| 2004/0203692 A1 | 10/2004 | Schwinke et al. |
| 2004/0203696 A1 | 10/2004 | Jijina et al. |
| 2004/0215464 A1* | 10/2004 | Nelson ............... 704/275 |
| 2004/0233868 A1 | 11/2004 | Farnham |
| 2004/0260543 A1 | 12/2004 | Horowitz et al. |
| 2005/0027538 A1 | 2/2005 | Halonen et al. |
| 2005/0038653 A1 | 2/2005 | Roth et al. |
| 2005/0043067 A1 | 2/2005 | Odell et al. |
| 2005/0043947 A1 | 2/2005 | Roth et al. |
| 2005/0043949 A1 | 2/2005 | Roth et al. |
| 2005/0049880 A1 | 3/2005 | Roth et al. |
| 2005/0102148 A1 | 5/2005 | Rogitz |
| 2005/0114141 A1 | 5/2005 | Grody |
| 2005/0137877 A1 | 6/2005 | Oesterling et al. |
| 2005/0143134 A1* | 6/2005 | Harwood et al. ......... 455/563 |
| 2005/0144007 A1* | 6/2005 | Silver et al. ............ 704/275 |
| 2005/0182558 A1 | 8/2005 | Maruta |
| 2005/0187768 A1 | 8/2005 | Godden |
| 2005/0192804 A1 | 9/2005 | Kitigawa et al. |
| 2005/0193092 A1 | 9/2005 | Habermas |
| 2005/0216272 A1 | 9/2005 | Rao |
| 2006/0015336 A1 | 1/2006 | Parthasarathy |
| 2006/0047386 A1* | 3/2006 | Kanevsky et al. ............ 701/36 |
| 2006/0190097 A1 | 8/2006 | Rubenstein |
| 2006/0206327 A1 | 9/2006 | Hennecke et al. |
| 2006/0206340 A1 | 9/2006 | Silvera et al. |
| 2007/0005206 A1 | 1/2007 | Zhang et al. |
| 2007/0005358 A1 | 1/2007 | Heidenreich et al. |
| 2007/0005360 A1 | 1/2007 | Hüning et al. |
| 2007/0015486 A1 | 1/2007 | Marlowe |
| 2007/0033055 A1 | 2/2007 | Tanaka |
| 2007/0061211 A1* | 3/2007 | Ramer et al. ................ 705/25 |

FOREIGN PATENT DOCUMENTS

| | | |
|---|---|---|
| EP | 823798 | 2/1998 |
| JP | 3029998 | 2/1991 |
| JP | 6066591 | 3/1994 |
| JP | 6239186 | 8/1994 |
| JP | 10247857 | 9/1998 |
| JP | 2002152234 | 5/2002 |
| JP | 2003124898 | 4/2003 |
| JP | 2003143502 | 5/2003 |
| WO | WO02/10903 | 2/2002 |

* cited by examiner

VOICE RECOGNITION UPDATES VIA REMOTE BROADCAST SIGNAL

BACKGROUND OF THE INVENTION

1. Field of the Invention

The present invention generally relates to a system and method for dynamically updating voice recognition commands stored in a vehicle. More specifically, the present invention relates to dynamically updating the voice recognition commands for various in-vehicle devices.

2. Description of Related Art

Automobiles equipped with speech-recognition and text-to-speech capabilities simplify tasks that would otherwise require a driver to take away his/her attention from driving. The uses of speech recognition range from controlling internal car temperature and radio volume to driver authentication and theft detection.

Current voice recognition systems offered on production automobiles allow a user (e.g., driver or passenger) to use dedicated, on-board voice recognition commands to control in-vehicle functions. For example, for in-vehicle radio or entertainment system controls, several voice recognition commands are available to the driver/passenger for choosing a specific preset radio station, radio frequency or multimedia source (e.g., CD or DVD). All of these voice recognition commands must, however, already be stored in the memory of the control system of the vehicle. These voice recognition commands cannot be updated without having to replace the storage media. In other words, the voice database for storing these voice recognition commands resides on a static system. If new features or commands are introduced, the storage media must be replaced—limiting the ability of the system to be updated on a continual basis.

Figure 1:
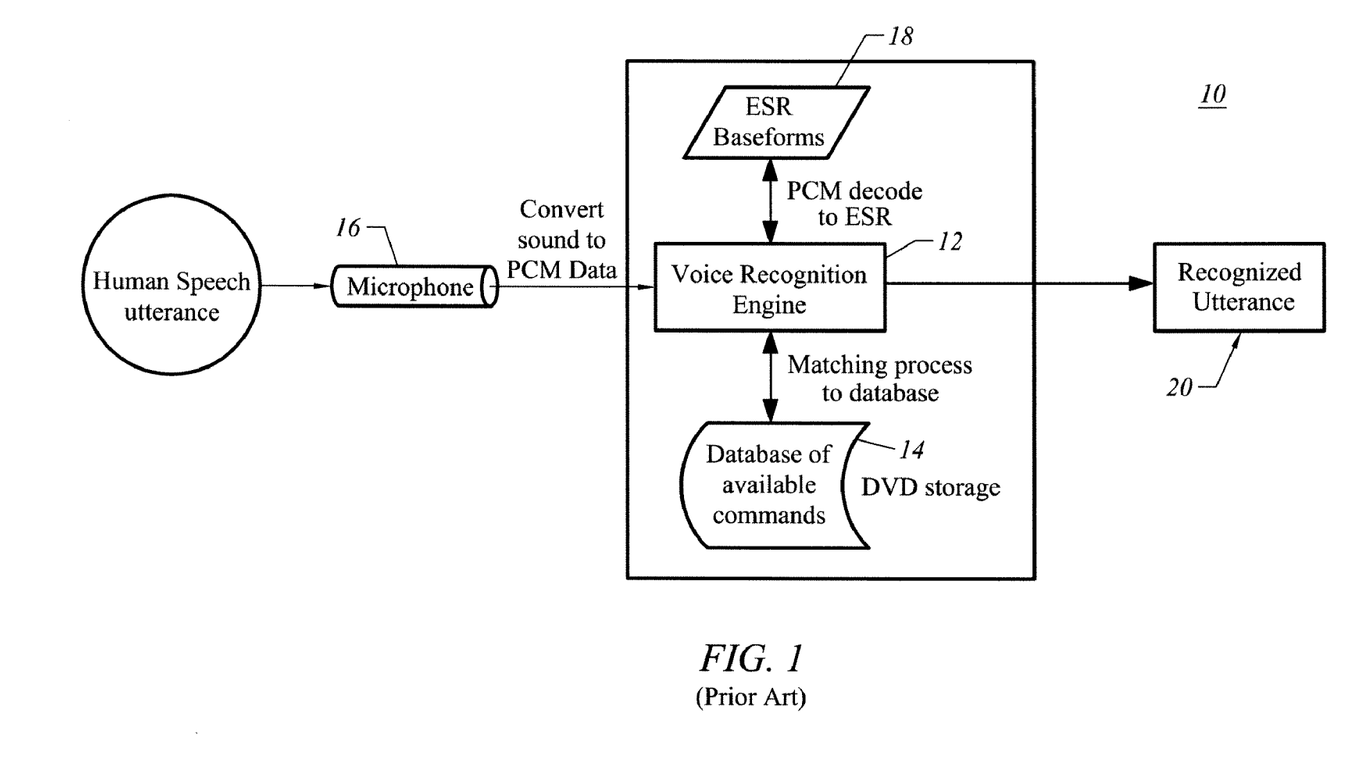
FIG. 1 is a schematic diagram of a voice recognition system, according to the prior art.

FIG. 1 illustrates a conventional in-vehicle voice recognition system 10. This conventional system 10 generally includes a voice recognition engine 12, a database 14 and a microphone 16. The available voice recognition commands are stored within the database 14, and are typically stored on a DVD that is provided with the vehicle. As discussed above, to load a new voice command in a conventional database of the vehicle would require issuing a new DVD, for example, and loading the information on the DVD into the vehicle.

The microphone 16 converts the utterance by the driver (e.g., "air conditioning on") into pulse code modulation (PCM) data, which is then transmitted to the voice recognition engine 12. The voice recognition engine 12 compares the PCM data to the available voice recognition commands stored in the database 14. If the voice recognition engine 12 matches the PCM data to a voice command, the voice recognition engine 12 sends the voice command, or recognized utterance 20, to the target in-vehicle device (e.g., air conditioner) and the function is executed (e.g., the air conditioner turns on).

When a conventional voice recognition system recognizes a command, the system creates a file format called PCM data. This PCM data is basically a voice file of the utterance. In order for the voice recognition engine 12 to recognize a human utterance, the engine 12 must translate this PCM file into a recognizable format. This translated phonetic data is commonly referred to in the voice recognition industry as an ESR baseform. ESR baseforms are the fundamental linguistic representations for how the system will recognize a voice recognition command. These ESR baseforms are matched with a database of available commands in some sort of storage medium and as a result, a command is executed if the command is correctly matched. The voice recognition engine 12 will perform all of the translating and processing. This technology is well known within the voice recognition industry.

Today, vehicles often include a satellite or digital radio receiver, which offers an uninterrupted, near CD quality radio broadcast. For example, a person could drive from San Francisco, Calif., to Washington, D.C., without ever having to change the radio station. The driver would never hear static interfering with his/her favorite radio station, and the music would be interrupted by few or no commercials. XM Satellite radio and Sirius Satellite radio have both launched such a service. Currently, a driver cannot use a voice command to select a digital radio channel by name. Instead, the driver may only audibly select a digital radio station by the station number. With more than 100 channels typically available through a satellite radio, choosing the digital station by channel number is difficult.

New digital radio stations are regularly added to the existing radio broadcast services. Even if the driver could use a voice command to select a radio station by name, the voice recognition commands would need to be updated every time a new station is added to the broadcast system. Otherwise, a driver would not be able to select the newly added radio station(s) as easily as the radio stations that existed when the satellite radio was purchased.

Therefore, there is a need for a system for dynamically updating the voice recognition database of a vehicle to accommodate the rapid expansion and penetration of voice recognition into the automotive industry.

SUMMARY OF THE INVENTION

The present invention provides a system and method for dynamically updating voice recognition commands stored in a vehicle, which in turn provides a user friendly in-vehicle voice recognition system.

In accordance with one aspect of the embodiments described herein, there is provided a method for remotely and dynamically updating voice recognition commands available for controlling a device in a vehicle comprising the steps of: (a) receiving a broadcast signal comprising voice recognition data; (b) filtering the received broadcast signal by separating the voice recognition data from a remainder of the broadcast signal; (c) updating a database containing previously stored voice recognition data with the received voice recognition data; (d) receiving a spoken command from an input device; (e) determining whether the received spoken command matches the voice recognition data stored in the database; and (f) generating a recognized voice command based at least in part on matching the received spoken command with the voice recognition data stored in the database.

In accordance with another aspect of the embodiments described herein, there is provided a system for dynamically updating voice recognition commands available for controlling a device in a vehicle having a broadcast system for sending a broadcast signal comprising voice recognition data and an in-vehicle voice recognition system. The in-vehicle voice recognition system comprises a receiver unit, a memory unit, a processor, a voice input device, and a voice recognition engine. The receiver unit is adapted to receive the broadcast signal. The memory unit contains a database of stored voice recognition commands. The processor is coupled to the receiver unit and the memory unit and is adapted to extract the voice recognition data from a remaining portion of the broadcast signal. The processor is further adapted to update the stored voice recognition commands stored in the memory unit with the extracted voice recognition data. The voice input device is adapted to receive a spoken command from a user.

The voice recognition engine is coupled to the voice input device and the memory unit. The voice recognition engine is adapted to determine whether the spoken command matches one of the stored voice recognition commands in the memory unit.

DETAILED DESCRIPTION OF THE PREFERRED EMBODIMENT

FIGS. 2-6 illustrate several embodiments of a system for dynamically updating the voice recognition commands stored in a voice recognition unit of the vehicle. While the following description of the system is directed to an application of voice recognition commands for controlling in-vehicle radio functions, it should be appreciated that the system would apply equally well to voice recognition commands for controlling other in-vehicle devices, such as air-conditioning, power windows, door locks and any other device within the vehicle.

Figure 2:
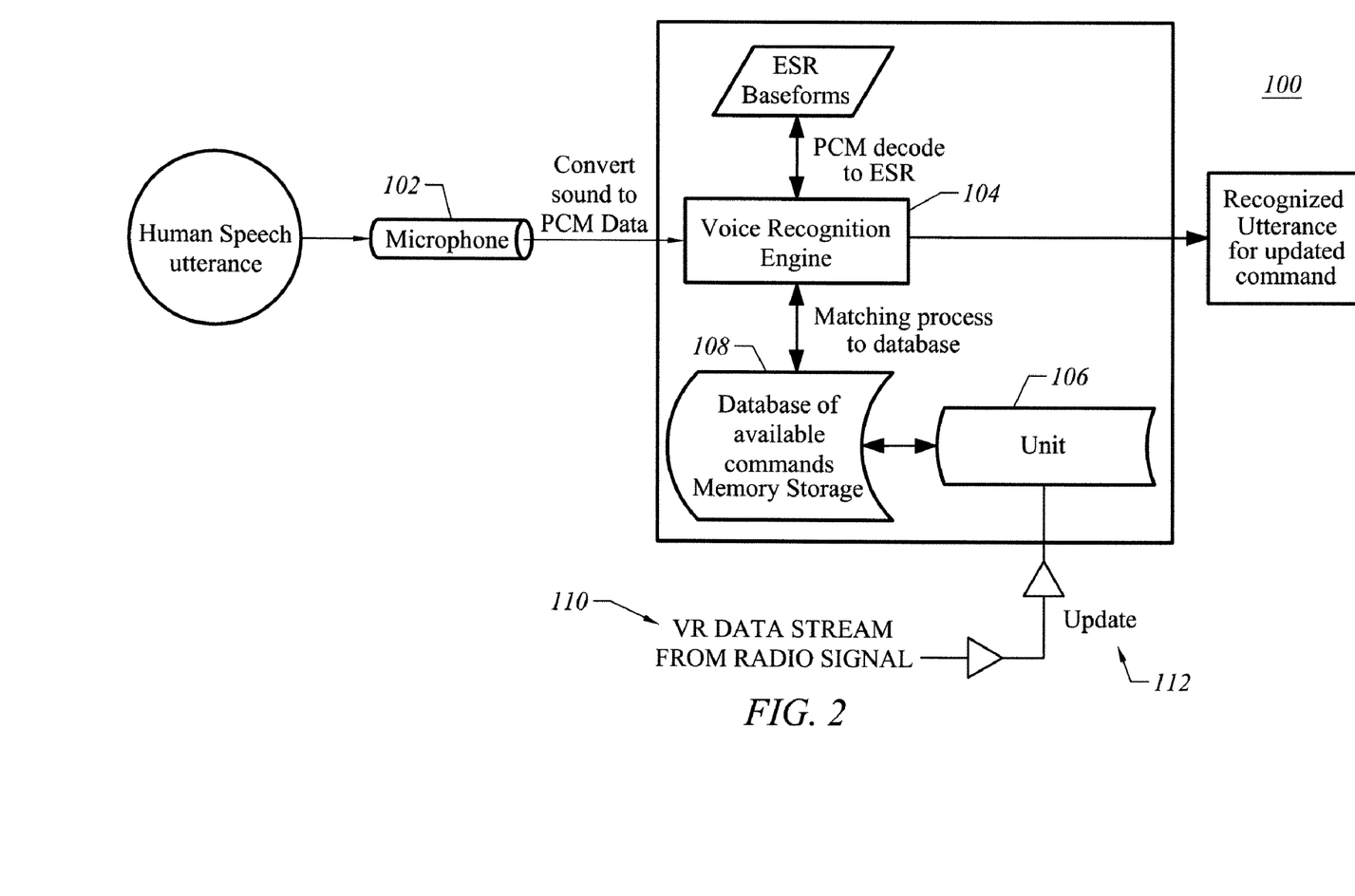
FIG. 2 is a schematic diagram of one embodiment of a voice recognition system, according to the present invention.

FIG. 2 illustrates one exemplary embodiment of a voice recognition system 100. In this embodiment, the in-vehicle voice recognition system 100 includes, among other things, a microphone 102, a voice recognition engine 104, a receiver unit 106 and a database 108. The database 108, similar to the database 14 in FIG. 1, stores the voice recognition commands available to the driver. The database 14 in FIG. 1, however, stores a static set of voice recognition commands that cannot be expanded without replacing the entire memory of the database. In contrast, the database 108 is stored in an updateable memory, as will be described in more detail later.

The receiver unit 106 may be located on a vehicle and allows the voice recognition commands stored in the database 108 to be updated remotely. The receiver unit 106 supports the receipt of content from a remote location that is broadcast over a one-to-many communication network. One-to-many communication systems include systems that can send information from one source to a plurality of receivers, such as a broadcast network. Broadcast networks include television, radio, and satellite networks. For example, the voice recognition commands may be updated by a remote broadcast signal such as the satellite radio broadcast service by XM. The one-to-many communication network may comprise a broadcast center that is further in communication with one or more communication satellites that relay a dedicated broadcast signal or a modified broadcast signal to a receiver unit 106 located in a vehicle. In the preferred embodiment, the broadcast center and the satellites are part of a satellite radio broadcasting system (e.g., XM Satellite Radio).

It will be understood that the dedicated broadcast signal and modified broadcast signal may be broadcast via any suitable information broadcast system (e.g., FM radio, AM radio, or the like), and is not limited to the satellite radio broadcast system. In the embodiment of FIG. 2, the receiver unit 106 of the system 100 receives a broadcast signal 110 that contains voice recognition data. The present system dynamically updates voice recognition commands through two types of broadcast signals: (1) a dedicated broadcast signal, and (2) a modified broadcast signal that will be explained in further detail later.

Figure 3A:
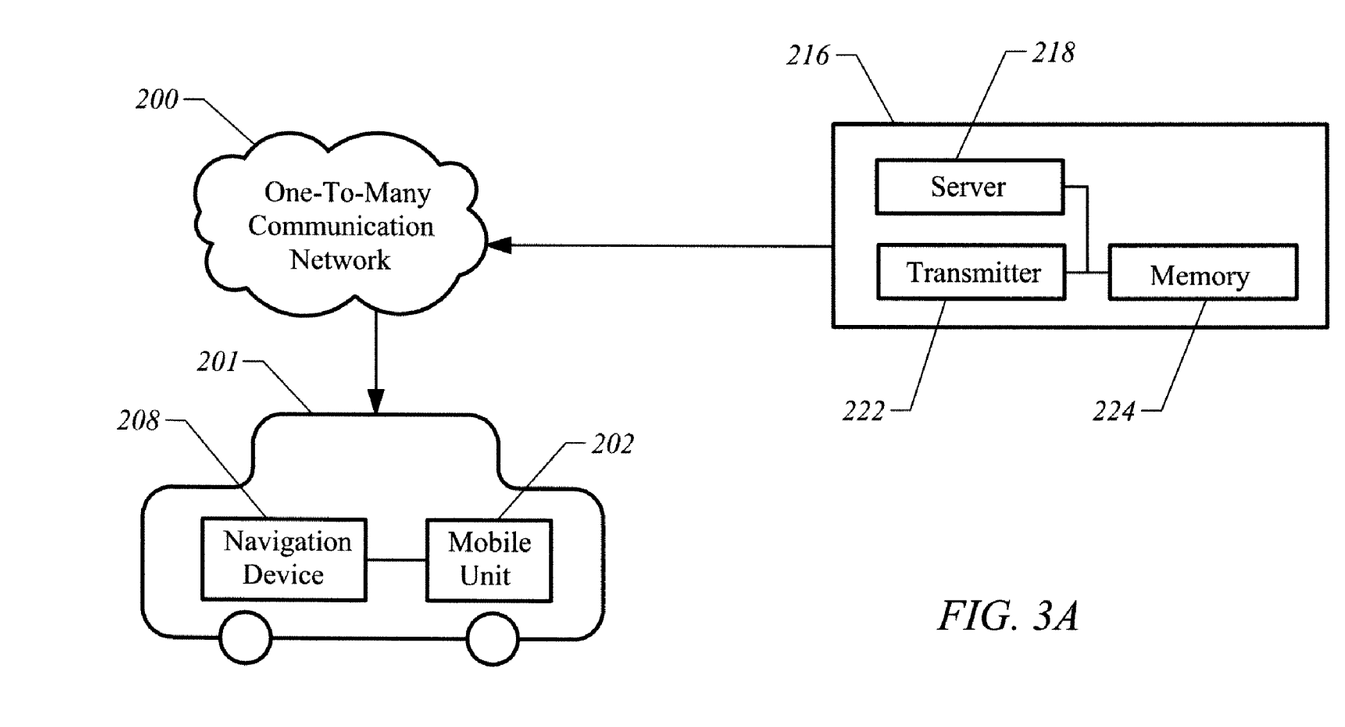
FIG. 3a is a schematic diagram of an embodiment of a communication system pursuant to aspects of the invention.

With reference to FIG. 3a, there is provided an embodiment of a system for the exchange of information between a remote location 216 and a vehicle 201. The remote location 216 is a server system for outputting vehicle broadcast data that is controlled by the vehicle manufacturer. The vehicle 201 includes a navigation device 208 and a mobile unit 202. The navigation device 208 is an electronic system used to provide driving directions, display of messages to the vehicle operator, and audio playback of messages or satellite radio broadcasting. The navigation device 208 is operatively coupled to the mobile unit 202 and supports the receipt of content from the remote location 216 that is broadcast over a one-to-many communication network 200. One-to-many communication systems include systems that can send information from one source to a plurality of receivers, such as a broadcast network. Broadcast networks include television, radio, and satellite networks.

In a preferred embodiment of the invention, voice recognition data is generated at the remote location 216 or may be generated at an alternate location and the voice recognition data is subsequently broadcast from the remote location 216 over the one-to-many communication network 200 to the vehicle 201. The mobile unit 202 receives the broadcasted message and may transmit the voice recognition data to the navigation device 208 for updating of the database of available voice recognition commands, which will be described in further detail.

The remote location 216 includes a remote server 218, a remote transmitter 222, and a remote memory 224, that are each in communication with one another. The remote transmitter 222 communicates with the navigation device 208 and mobile unit 202 by way of the broadcast 200 communication network. The remote server 218 supports the routing of message content over the broadcast network 200. The remote server 218 comprises an input unit, such as a keyboard, that allows the vehicle manufacturer to enter voice recognition data into memory 224 and a processor unit that controls the communication over the one-to-many communication network 200.

The server 218 is in communication with the vehicle over a one-to-many communication network 200. In the present embodiment, the one-to-many communication network 200 comprises a broadcast center that is further in communication with one or more communication satellites that relay the vehicle safety message as a broadcast message to a mobile unit 202 in the owner's vehicle 201. In the present embodiment, the broadcast center and the satellites are part of a satellite radio broadcasting system (e.g., XM Satellite Radio). It will be understood that the safety message can be broadcast via any suitable information broadcast system (e.g., FM radio, AM radio, or the like), and is not limited to the satellite radio broadcast system. In one embodiment, the mobile unit 202 relays the safety message to an onboard computer system, such as the vehicle's navigation system 208, which in turn updates the database of available voice recognition commands.

Figure 3B:
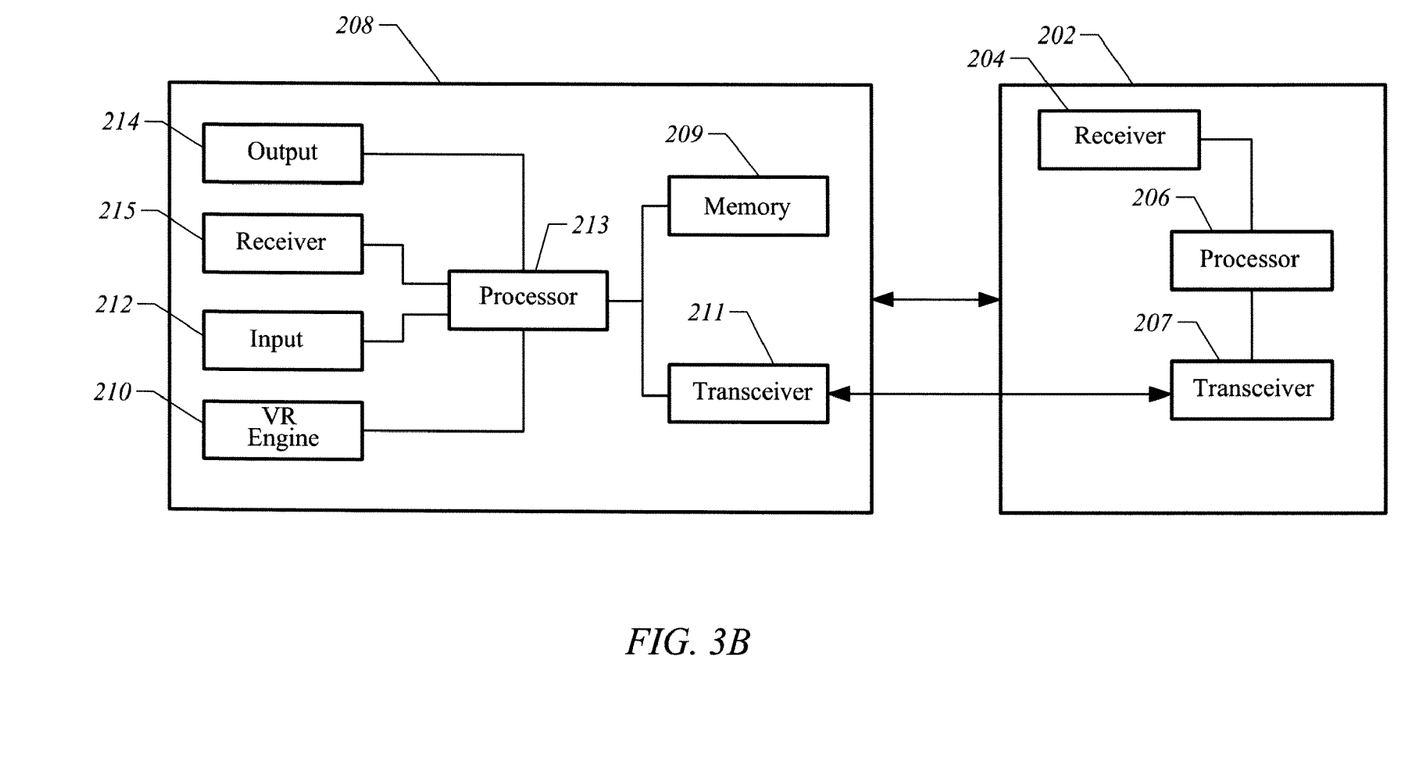
FIG. 3b is a schematic diagram of a navigation device in communication with a mobile unit according to an embodiment of the invention.
Figure 4:
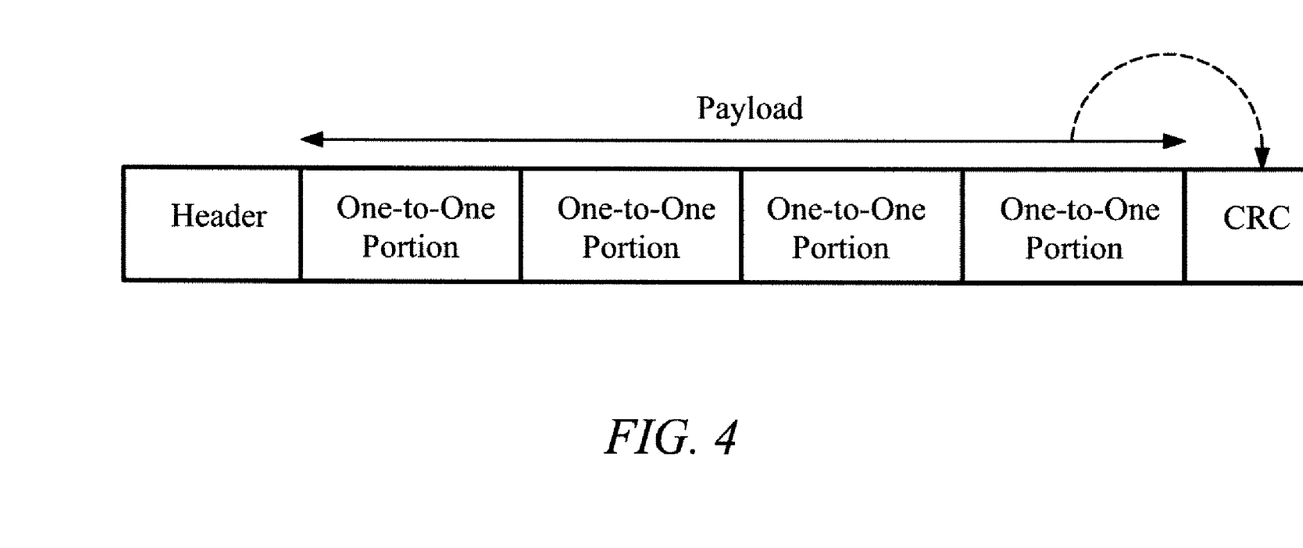
FIG. 4 is a block diagram of an embodiment of a multi-packet dedicated broadcast data message.

FIG. 3b shows an expanded view of both the navigation device 208 and the mobile unit 202 contained on the vehicle 201. The navigation device 208 may include an output unit 214, a receiver unit 215, an input unit 212, a voice recognition engine 210, a navigation memory unit 209, a navigation processor unit 213, and an RF transceiver unit 211 that are all in electrical communication with one another. The navigation memory unit 209 may include a database of voice recognition phonetic data or alternately, the database may be stored in memory not contained in the navigation device 208. The database of voice recognition phonetic data may be updated in the vehicle by way of the input unit 212, which can include at least one of a keyboard, a touch sensitive display, jog-dial control, and a microphone. The database of voice recognition phonetic data may also be updated by way of information received through the receiver unit 215 and/or the RF transceiver unit 211.

The receiver unit 215 receives information from the remote location 216 and, in one embodiment, is in communication with the remote location by way of a one-to-many communication network 200 (see FIG. 3a). The information received by the receiver 215 may be processed by the navigation processor unit 213. The processed information may then be displayed by way of the output unit 214, which includes at least one of a display and a speaker. In one embodiment, the receiver unit 215, the navigation processor unit 213 and the output unit 214 are provided access to only subsets of the received broadcast information.

In the embodiment shown in FIG. 3b, the mobile unit 202 includes a wireless receiver 204, a mobile unit processor 206, and an RF transceiver unit 207 that are in communication with one another. The mobile unit 202 receives communication from the remote location 216 by way of the receiver 204.

In one embodiment, the navigation device 208 and mobile unit 202 are in communication with one another by way of RF transceiver units 207 and 211. Both the navigation device 208 and the mobile unit 202 include RF transceiver units 211, 207, which, in one embodiment, comply with the Bluetooth® wireless data communication format or the like. The RF transceiver units 211, 207 allow the navigation device 208 and the mobile unit 202 to communicate with one another.

The voice recognition data is transmitted from the remote location 216 to the navigation device 208 by way of the broadcast network 200. At the vehicle, the voice recognition data may be stored in the memory 209 of the navigation device 208. Further details regarding embodiments of information exchange systems can be found in U.S. patent application Ser. No. 11/100,868, filed Apr. 6, 2005, titled "Method and System for Controlling the Exchange of Vehicle Related Messages," the disclosure of which is incorporated in its entirety herein by reference.

In embodiments that involve broadcasting the voice recognition data to affected vehicle owners, one or a few messages may be transmitted over a one-to-many communication network 200 that each comprise a plurality of one-to-one portions (shown in FIG. 4), as opposed to transmitting a separate message for each vehicle. Each one-to-one portion will typically be applicable to a single affected vehicle and allows for the broadcast of targeted vehicle information over a one-to-many network 200 using less bandwidth than if each message was sent individually. When broadcasting a message over a one-to-many communication network 200, all vehicles 201 within range of the network 200 may receive the message, however the message will be filtered by the mobile unit 202 of each vehicle 201 and only vehicles 201 specified in the one-to-one portions of the message will store the message for communication to the vehicle owner. In one embodiment, each one-to-one portion comprises a filter code section. The filter code section can comprise a given affected vehicle's vehicle identification number (VIN) or another suitable vehicle identifier known in the art. The vehicle identifier will typically comprise information relating to the vehicle type, model year, mileage, sales zone, etc., as explained in further detail in U.S. patent application Ser. No. 11/232,311, filed Sep. 20,2005, titled "Method and System for Broadcasting Data Messages to a Vehicle," the content of which is incorporated in its entirety into this disclosure by reference.

One embodiment of the present invention, receives voice recognition updates from a dedicated broadcast data stream. The dedicated data stream utilizes a specialized channel connection such as the connection described for transmitting traffic data described in further detail in U.S. patent application Ser. No. 11/266,879, filed Nov. 4, 2005, titled Data Broadcast Method for Traffic Information, the disclosure of which is incorporated in its entirety herein by reference. For example, the XM Satellite Radio signal uses 12.5 MHz of the S band: 2332.5 to 2345.0 MHz. XM has agreed to provide portions of the available radio bandwidth to certain companies to utilize for specific applications. The transmission of messages over the negotiated bandwidth would be considered to be a dedicated data stream. In a preferred embodiment, only certain vehicles would be equipped to receive the dedicated broadcast signal or data set. For example, the dedicated broadcast signal may only be received by Honda vehicles through a particular Honda satellite channel connection and a satellite radio receiver. However, the broadcast signal may comprise, by way of example only, a digital signal, FM signal, WiFi, cell, a satellite signal, a peer-to-peer network and the like. In an embodiment of the invention, voice recognition data is embedded into the dedicated broadcast message received at the vehicle.

To install a new voice recognition command in the vehicle, the dedicated radio signal, containing one or a plurality of new or updated voice recognition phonetics, is transmitted to each on-board vehicle receiver unit 204. With a dedicated signal, the in-vehicle hardware/software architecture would be able to accept this signal. In a preferred embodiment, other vehicles or even older vehicles without a receiver unit 204 would not be able to receive, let alone process the data.

In an exemplary embodiment, after the mobile unit receiver 204 receives a broadcast signal, the receiver 204 transmits the dedicated broadcast signal to the on-board vehicle processor 206. The broadcast signal is then deciphered or filtered by the processor 206. For example, the processor 206 filters out the voice recognition phonetics from the other portions of the dedicated broadcast signal (e.g., traffic information, the radio broadcast itself, etc.). The other portions of the broadcast signal are sent to the appropriate in-vehicle equipment (e.g., satellite radio receiver, navigation unit, etc.).

In the present embodiment, the voice recognition phonetics data is sent by the processor 206 to the navigation device 208, and is stored in the on-board memory 209 of the device. This updated voice recognition data, once stored in the on-board memory 209, is then available to the voice recognition engine 210. The on-board memory 209 may comprise any type of electronic storage device such as, but not limited to, a hard disk, flash memory, and the like. The on-board memory 209 may be separate from the navigation device 208 or integrated into it. The function of the on-board memory 209 can be dedicated to storing only voice recognition phonetic data or may comprise a multi-function storage capacity by also storing other content such as digital music and navigation-related information.

The navigation device 208 preferably includes an electronic control unit (ECU) (not shown). The ECU processes the voice recognition phonetic data received by the receiver 204 so that the voice recognition commands stored in the on-board memory 209 can be used by the system. In operation, voice recognition data is transmitted to the vehicle and is stored in the on-board memory 209. The ECU organizes and formats the data stored in the memory 209 into a format that is readable by the system, and in particular, so that the voice recognition engine 210 can read the data.

The voice recognition engine 210 receives voice command signals (e.g., "select National Public Radio" or "select NPR") from an input device 212 such as a microphone. The voice recognition engine 210 may be integral to the navigation device 208 or may be a separate device. The voice recognition engine 210 can identify voice recognition commands in addition to tuning commands for the satellite radio receiver. For example, the voice recognition engine 210 can be used to identify a volume command, fade command, balance command or other functional commands of the vehicle radio system. The voice recognition engine 210 may also be used to control other in-vehicle devices such as the air conditioning, power windows and so on. A storage module (not shown) that is configured to store information relating to the programming information for digital channels received by the receiver unit 204 may be coupled to the voice recognition engine 210.

For example, a satellite radio broadcast may add a CNN digital channel to the radio lineup after a vehicle has been purchased. In a conventional satellite radio system, the driver would only be able to manually select the new CNN digital channel. The voice recognition system 10 would not include a CNN voice command pre-stored in the database 14. In the present invention, the receiver 204 would receive a broadcast signal containing a voice recognition command for "CNN." After the CNN voice command was stored in the memory 209, the driver would be able to say, for example, "select radio channel CNN," and the voice recognition engine 210 would identify the words "radio channel" based on a fixed command set stored in a fixed command table of the memory 209. The variable part—"CNN"— is also compared with phonemes in the channel table of available channels.

The voice recognition engine 210 would then match the utterance by the driver or command "CNN" with the "CNN" string of phonemes stored in the memory 209 and adjusts the tuner to the channel number corresponding to CNN. The CNN signal transmitted by the broadcast service (e.g., XM Satellite radio) is then received by the radio of the vehicle. Voice recognition systems are currently available and known within the automobile industry and therefore, additional disclosure of the operation of the voice recognition engine is not required.

Broadcasting the updated voice recognition data through a dedicated broadcast signal to the vehicles on the road provides each vehicle with accurate, concise up-to-date data. For specific functions such as selecting digital channels and categories, updating the voice recognition commands keeps the voice recognition commands available to the driver (or a passenger) current should the lineup change by the vendor. A byproduct of this improvement is the application of voice recognition technology in areas where voice recognition commands could previously not be used due to the possible change in names or options.

A second embodiment of the present invention receives voice recognition updates from a modified broadcast signal. In an exemplary modified broadcast signal, voice recognition data may be transmitted in a subcarrier of the radio signal such as in a Radio Data System (RDS) signal shown in FIG. 5. The subcarrier is a portion of the channel range. The outlying portions of the radio frequency range are often used for additional transmission (i.e., text data). Song titles, radio station names, and stock information are commonly transferred today. It should be appreciated that the subcarrier may be used to carry voice recognition data in any radio signal (e.g., FM, AM, XM, Sirius). The embodiment of the invention transmits text data pertaining to word phonetics by using the extra subcarrier range.

Figure 6:
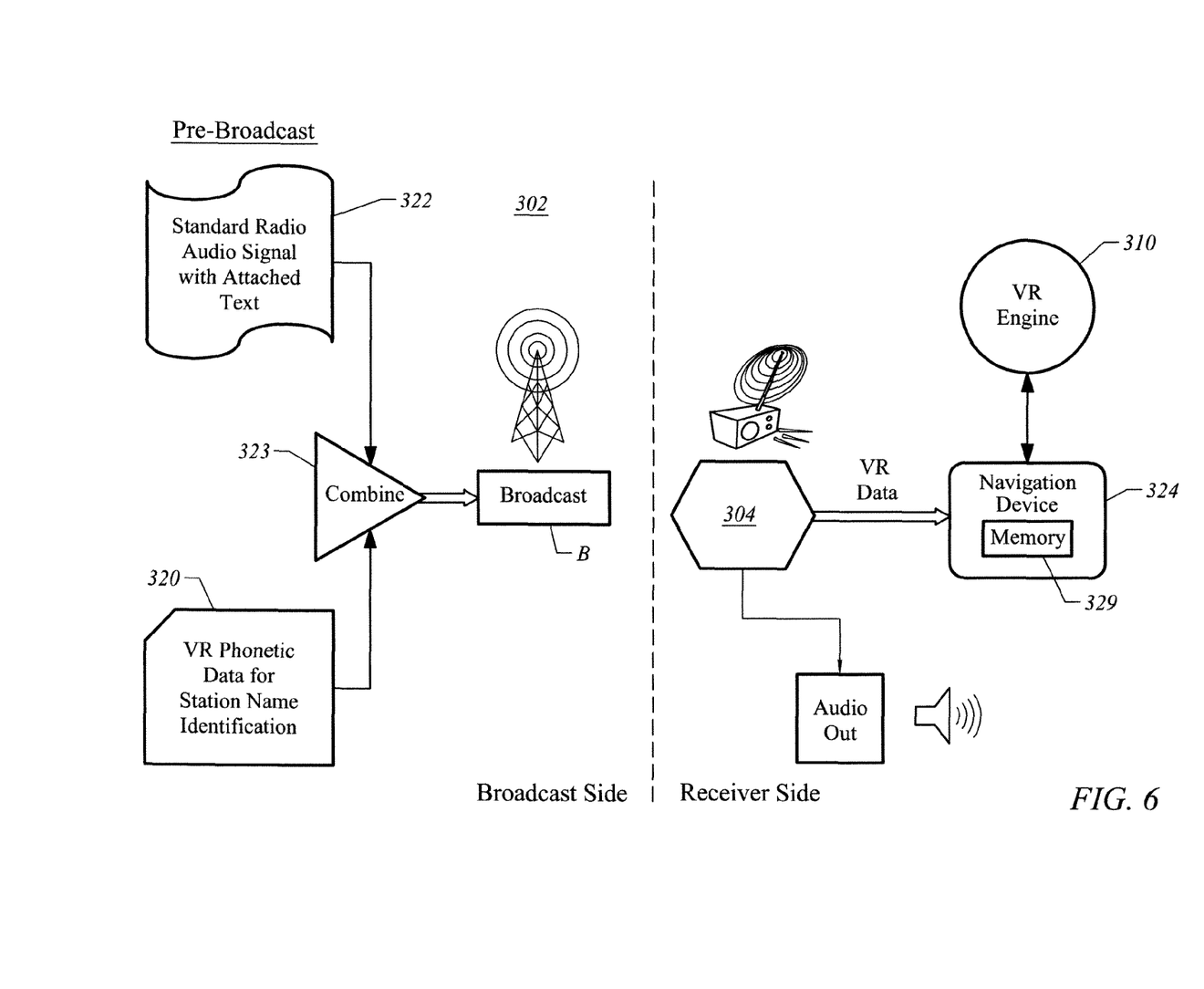
FIG. 6 is a schematic diagram illustrating an embodiment of the modified broadcast data stream.

An exemplary modified broadcast signal may be a standard radio audio signal 322 such that the radio signal is modified or combined 323 to also include voice recognition phonetic data 320 as shown in FIG. 6. Combining multiple data streams into a single signal prior to broadcast is known within the electronic art and therefore, does not require further description. In this embodiment, the modified broadcast signal updates the voice recognition commands stored in a navigation device 324. The modified broadcast signal, similar to the dedicated broadcast signal shown in FIG. 4, may transmit signals through various channels (e.g., radio, satellite, WiFi, etc.).

Figure 5:
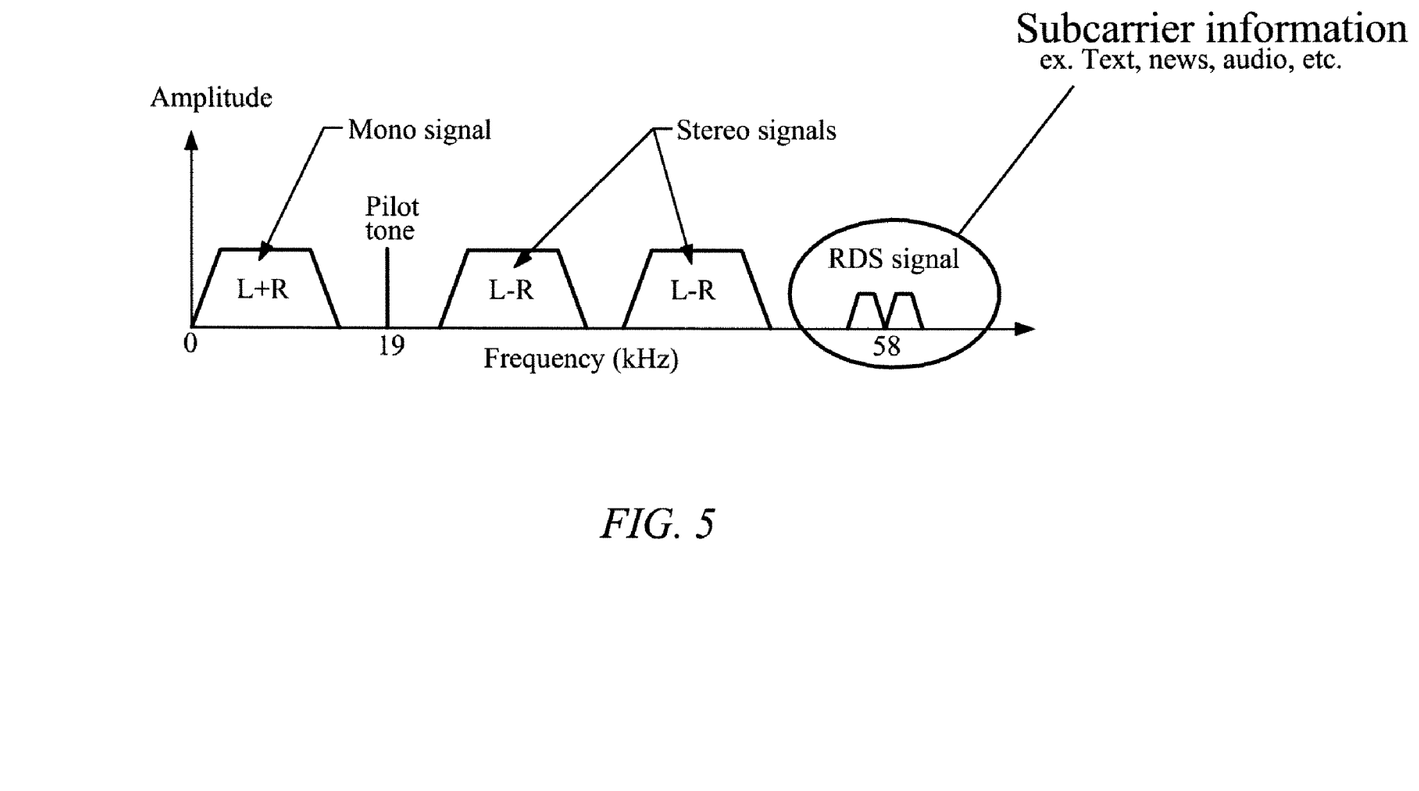
FIG. 5 is a diagram illustrating a subcarrier of a radio signal.

The embodiment of FIG. 5 specifically illustrates transmitting voice recognition phonetic data in connection with radio station name updates. New digital channels are continuously being offered to satellite radio owners, and the channel lineup is subject to change at any time. In this embodiment, any time the satellite radio broadcast adds, for example, a new radio station channel, voice recognition data for the new station channel may be immediately broadcast to all vehicles capable of receiving the modified broadcast signal. The system may broadcast other updates too. This method allows the commands for the radio channels and categories to be up-to-date soon after there is a line-up change.

The receiver unit 304 of the vehicle constantly receives the voice recognition data 320 along with the radio audio signal 322. The receiver unit 304 separates the voice recognition phonetic data 320 from the radio audio signal 322 as is conventionally done with channel, category, and song information, and is known within the art. The voice recognition phonetic data 320 is sent to the navigation device 324 and stored in the memory 329. The newly stored voice recognition phonetic data 320 may then be referenced whenever the user (e.g., driver or passenger) searches for a specific digital radio channel or category using the voice recognition features of the satellite radio. The voice recognition phonetic data 320 may also comprise voice recognition commands for other equipment in the vehicle, such as the air conditioning system, power windows, and so on. If the vehicle manufacturer intends to add a new voice command feature to the vehicle, the new voice command may simply be transmitted to the vehicle. Once the voice command is stored in the memory 329, the driver may use the voice command to control the item of equipment.

It should be appreciated that the above-described methods for dynamically updating in-vehicle voice recognition commands are for explanatory purposes only and that the invention is not limited thereby. Having thus described a preferred embodiment of a method and system for dynamically updating voice recognition commands, it should be apparent to those skilled in the art that certain advantages of the described method and system have been achieved. It should also be appreciated that various modifications, adaptations, and alternative embodiments thereof may be made within the scope and spirit of the present invention. It should also be apparent that many of the inventive concepts described above would be equally applicable to the use of other voice recognition systems.

What is claimed is:

1. A method for remotely and dynamically updating voice recognition commands available for controlling a device in a vehicle, the method comprising:
    (a) receiving, locally, a broadcast signal from a remote source, the broadcast signal comprising voice recognition data;
    (b) filtering, locally, the received broadcast signal by separating the voice recognition data from a remainder of the broadcast signal;
    (c) updating a local database containing previously stored voice recognition data with the received voice recognition data;
    (d) receiving, locally, a spoken command from a local input device;
    (e) determining whether the received spoken command matches the voice recognition data stored in the updated local database; and
    (f) generating, locally, a recognized voice command based at least in part on matching the received spoken command with the voice recognition data stored in the updated local database.

2. The method as recited in claim 1, wherein updating the local database containing previously stored voice recognition data with the received voice recognition data further comprises determining a portion of the voice recognition data that is new and adding the new voice recognition data to the local database.

3. The method as recited in claim 1, wherein updating the local database containing previously stored voice recognition data with the received voice recognition data further comprises determining a portion of the voice recognition data that is changed and modifying the voice recognition data in the local database with the changed voice recognition data.

4. The method as recited in claim 1, wherein receiving, locally, a broadcast signal further comprises receiving, locally, a satellite signal.

5. The method as recited in claim 1, wherein receiving, locally, a broadcast signal further comprises receiving, locally, a modified broadcast signal.

6. The method as recited in claim 5, wherein receiving, locally, a broadcast signal comprising voice recognition data further comprises receiving, locally, the voice recognition data in a subcarrier of the modified broadcast signal.

7. The method as recited in claim 1, wherein receiving, locally, a broadcast signal further comprises receiving, locally, a dedicated broadcast signal.

8. The method as recited in claim 1, wherein receiving, locally, a broadcast signal containing voice recognition data comprises receiving, locally, voice recognition data further comprising phonetic data for station name identification.

9. The method as recited in claim 1, further comprising sending the recognized voice command to an affected device in the vehicle after the generating step.

10. The method as recited in claim 9, wherein sending the recognized voice command to the affected device comprises sending the recognized voice command to a device selected from a group consisting of a radio, an air conditioning unit, power windows, door locks, and a navigation unit.

11. A system for dynamically updating voice recognition commands available for controlling a device in a vehicle, the system comprising:
    a broadcast system, to be located remotely from the vehicle, for sending a broadcast signal comprising voice recognition data; and
    an in-vehicle voice recognition system to be located within the vehicle, the in-vehicle voice recognition system comprising:
        a receiver unit adapted to receive the broadcast signal;
        a memory unit containing a database of stored voice recognition commands;
        a processor coupled to the receiver unit and the memory unit, the processor being adapted to extract the voice recognition data from a remaining portion of the broadcast signal and further adapted to update the stored voice recognition commands stored in the memory unit with the extracted voice recognition data;
        a voice input device adapted to receive a spoken command from a user; and
        a voice recognition engine coupled to the voice input device and the memory unit, the voice recognition engine being adapted to determine whether the spoken command matches one of the stored voice recognition commands in the memory unit.

12. The system as recited in claim 11, wherein the voice input device comprises a microphone.

13. The system as recited in claim 11, wherein the voice recognition data comprises station name identification.

14. The system as recited in claim 11, wherein the broadcast system comprises a satellite radio broadcast system.

15. The system as recited in claim 11, wherein the broadcast signal comprises a modified broadcast signal.

16. The system as recited in claim 15, wherein the voice recognition data is contained in a subcarrier of the modified broadcast signal.

17. The system as recited in claim 11, wherein the broadcast signal comprises a dedicated broadcast signal.

18. The system as recited in claim 11, wherein the voice recognition engine is further adapted to send the recognized voice command to an affected device in the vehicle.

19. The system as recited in claim 18, wherein the affected device is selected from a group consisting of a radio, an air conditioning unit, power windows, door locks, and a navigation unit.

20. The system as recited in claim 11, wherein the processor is further adapted to determine a portion of the voice recognition data that is new and add the new voice recognition data to the database.

21. The system as recited in claim 11, wherein the processor is further adapted to determine a portion of the voice recognition data that is changed and modify the voice recognition data in the database with the changed voice recognition data.

* * * * *